US012616267B2

(12) United States Patent
    Ipsen

(10) Patent No.: US 12,616,267 B2
(45) Date of Patent: May 5, 2026

(54) JOINT ASSEMBLY FOR A HELMET SYSTEM

(71) Applicant: FalCom A/S, Ballerup (DK)

(72) Inventor: Klaus Sommer Ipsen, Vanløse (DK)

(73) Assignee: FalCom A/S, Ballerup (DK)

( * ) Notice: Subject to any disclaimer, the term of this patent is extended or adjusted under 35 U.S.C. 154(b) by 5 days.

(21) Appl. No.: 18/946,803

(22) Filed: Nov. 13, 2024

(65) Prior Publication Data

US 2025/0169563 A1    May 29, 2025

(30) Foreign Application Priority Data

Nov. 24, 2023    (EP) .................................... 23212055

(51) Int. Cl.
    *A42B 3/16*      (2006.01)
    *A42B 1/24*      (2021.01)
    *A42B 3/04*      (2006.01)
    *G02B 23/12*     (2006.01)

(52) U.S. Cl.
    CPC ................. *A42B 3/166* (2013.01); *A42B 1/24* (2013.01); *A42B 3/04* (2013.01); *A42B 3/0406* (2013.01); *A42B 3/16* (2013.01); *G02B 23/12* (2013.01)

(58) Field of Classification Search
    CPC ........... A42B 1/24; A42B 3/04; A42B 3/0406; A42B 3/16; A42B 3/166; G02B 23/12
    USPC ..................................................... 2/422, 423
    See application file for complete search history.

(56) References Cited

U.S. PATENT DOCUMENTS

| | | | | | |
|---|---|---|---|---|---|
| 3,430,261 | A | * | 3/1969 | Benner | A42B 3/166 |
| | | | | | 381/376 |
| 3,461,463 | A | * | 8/1969 | Beguin | A42B 3/166 |
| | | | | | 381/376 |
| 3,721,993 | A | * | 3/1973 | Lonnstedt | A61F 11/14 |
| | | | | | 2/209 |
| 3,795,919 | A | * | 3/1974 | Aho | A42B 3/166 |
| | | | | | 2/423 |
| 4,027,341 | A | * | 6/1977 | Patteri | A42B 3/166 |
| | | | | | 381/189 |
| 4,069,512 | A | * | 1/1978 | Palmaer | A42B 3/166 |
| | | | | | 2/209 |
| 4,104,743 | A | * | 8/1978 | Bottger | A42B 3/166 |
| | | | | | 2/423 |
| 4,109,320 | A | * | 8/1978 | Anderson | A61F 9/06 |
| | | | | | 2/10 |
| 4,186,447 | A | * | 2/1980 | Palmaer | A42B 3/166 |
| | | | | | 2/209 |
| 4,316,290 | A | | 2/1982 | Montesi | |
| 4,347,631 | A | * | 9/1982 | Newcomb | A42B 3/166 |
| | | | | | 381/189 |

(Continued)

OTHER PUBLICATIONS

Extended European Search Report for EP Patent Appln. No. 23212055.0 dated Apr. 19, 2024.

*Primary Examiner* — Khaled Annis
*Assistant Examiner* — Dakota Marin
(74) *Attorney, Agent, or Firm* — Vista IP Law Group, LLP

(57) ABSTRACT

Disclosed is a joint assembly for a helmet system. The joint assembly comprises an assembly base, an ear cup arm, a locking element, and a spring assembly. The ear cup arm is pivotably arranged to the assembly base. The locking element is configured to lock the ear cup arm in a first position relative to the assembly base. The spring assembly is configured to move the ear cup arm to a second position relative to the assembly base upon release of the locking element.

13 Claims, 3 Drawing Sheets

(56)         References Cited

U.S. PATENT DOCUMENTS

| | | | | |
|---|---|---|---|---|
| 4,391,000 A * | 7/1983 | Lonnstedt | | A42B 3/166 |
| | | | | 2/209 |
| 5,339,464 A * | 8/1994 | Dor | | G02B 23/125 |
| | | | | 403/321 |
| 5,546,610 A * | 8/1996 | Herzig | | A42B 3/166 |
| | | | | 2/424 |
| 6,115,846 A * | 9/2000 | Truesdale | | A42B 3/042 |
| | | | | 2/209.13 |
| 7,283,641 B2 * | 10/2007 | Rolla | | A42B 3/166 |
| | | | | 381/376 |
| 7,908,667 B2 * | 3/2011 | Rogers | | A42B 3/04 |
| | | | | 2/6.2 |
| 8,166,575 B2 * | 5/2012 | Haselmayer | | A42B 3/166 |
| | | | | 2/10 |
| 10,350,113 B2 * | 7/2019 | Le | | H04R 1/1066 |
| 10,617,168 B2 * | 4/2020 | Winters | | A42B 3/04 |
| 11,103,021 B2 * | 8/2021 | Le | | A42B 3/0406 |
| 2002/0104192 A1 * | 8/2002 | Iguchi | | A44C 5/14 |
| | | | | 16/386 |
| 2009/0260135 A1 | 10/2009 | Haselmayer | | |
| 2011/0314594 A1 * | 12/2011 | Rogers | | A42B 3/04 |
| | | | | 2/421 |
| 2012/0002046 A1 * | 1/2012 | Rapoport | | G02B 27/0176 |
| | | | | 348/E7.091 |
| 2012/0317706 A1 * | 12/2012 | Lebel | | A42B 3/04 |
| | | | | 2/422 |
| 2013/0219598 A1 * | 8/2013 | Pfanner | | A42B 3/166 |
| | | | | 2/423 |
| 2015/0041243 A1 * | 2/2015 | Ratliff | | A42B 3/166 |
| | | | | 181/129 |
| 2015/0208749 A1 * | 7/2015 | Carroll | | A42B 3/044 |
| | | | | 2/422 |
| 2017/0049179 A1 | 2/2017 | Nordin et al. | | |
| 2018/0168270 A1 * | 6/2018 | Vaccaro | | H04R 1/105 |

* cited by examiner

JOINT ASSEMBLY FOR A HELMET SYSTEM

RELATED APPLICATION DATA

This application claims priority to, and the benefit of, European patent application No. 23212055.0 filed on Nov. 24, 2023. The entire disclosure of the above application is expressly incorporated by reference herein.

FIELD

The present disclosure pertains to the field of helmet systems, such as tactical helmet system. The present disclosure relates to a joint assembly, such as an ear protector joint assembly, for arranging an ear protector to a helmet of the helmet system.

BACKGROUND

Tactical helmet systems typically comprise hearing protecting means, such as ear protectors, arranged to the helmet for protecting the hearing of the user of the helmet system. The ear protectors are typically movably arranged to the helmet system between an open position in which the ear protectors do not cover the ears of the user and a closed position in which the ear protectors cover the ears of the user.

Known hearing protecting means for tactical helmet systems comprise an ear cup secured to the helmet system via a mounting arrangement. The mounting arrangement typically comprises a pivotable arm which can be pivoted around a pivot point between an outward, such as an open, position and an inward, such as a closed, position relative to the helmet. The arm may comprise a sliding surface, such as a slit, over which a pin is configured to slide when the ear cup is moved outwardly or inwardly. A spring member may be connected at one end to the helmet and at the other end to the slidable pin for normally holding the ear hood against the ear. When the ear hood is moved outwardly from the helmet, such as from an ear of the user, the pin slides over the sliding surface from one end of the sliding surface to the other end of the sliding surface. The attachment point of the spring member relative to the arm is thus moved from one end of the sliding surface to the other end of the sliding surface when the ear cup is moved between the outward position and the inward position. By moving the attachment point of the spring, the force of the spring on the pin can be moved to opposite sides of a pivot point of the arm, so that the spring member secures the arm in either position depending on the position of the pin in relation to the sliding surface. The arm is thus held in its position only by means of the spring force.

Such a mounting arrangement has the drawback that the pin sliding over the sliding surface causes wear on the pin, the sliding surface and/or the spring member, which can lead to play between the components. Once the play gets to extensive, the arm may no longer be sufficiently secured in either position and may undesirably move from these positions. This may be an annoyance and/or a health hazard for the user of the helmet system in case the ear cups move away from the closed position in a noisy environment, such as during combat. During movement of the arm between the outward position and the inward position, the sliding pin will further pass a point of equilibrium. Once the pin has passed the point of equilibrium the spring member will forcefully pull the sliding pin towards the end position of the sliding surface. This may cause a loud noise, such as a bang, when the pin hits the end position, which in itself may hurt the hearing of the user of the tactical helmet system.

SUMMARY

Accordingly, there is a need for a joint assembly for a helmet system, which mitigates, alleviates, or addresses the shortcomings existing and provides a more secure and less noisy means for attaching an ear protector system to a helmet system.

Disclosed is a joint assembly for a helmet system. The joint assembly comprises an assembly base, an ear cup arm, a locking element, and a spring assembly. The ear cup arm is pivotably arranged to the assembly base. The locking element is configured to lock the ear cup arm in a first position relative to the assembly base. The spring assembly is configured to move the ear cup arm to a second position relative to the assembly base upon release of the locking element.

It is an advantage of the present disclosure that the spring assembly is configured to force the ear cup arm in one single direction. The securing of the ear cup arm is done by the locking element. No movable parts are therefore required for moving the connection point of the spring assembly to opposite sides of the pivot point of the arm, as is required in known solutions where the spring force secures the arm in position. By providing a dedicated locking element configured to lock the ear cup arm in a first position relative to the assembly base a more secure engagement of the ear cup arm in the first position, with no or limited risk for unintended release of the ear cups from the ears of the user, can be provided. Furthermore, since the connection point of the spring assembly can be fixed, wear of the components of the joint assembly and the noise caused by movement of the joint assembly can be reduced, thereby increasing the comfort and safety for the user of the joint assembly.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
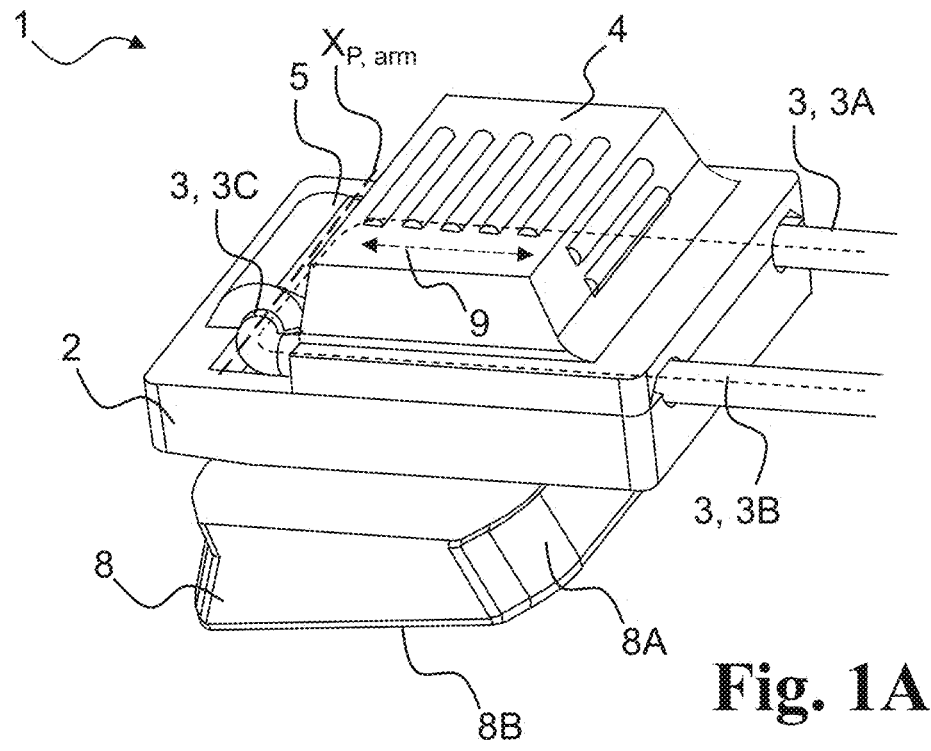
FIG. 1A illustrates a perspective view from a side of a first example joint assembly according to this disclosure.

Various exemplary embodiments and details are described hereinafter, with reference to the figures when relevant. It should be noted that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The current disclosure relates to a joint assembly, such as an ear protector joint assembly, for a helmet system. The joint assembly comprises an assembly base, an ear cup arm, a locking element, and a spring assembly. The ear cup arm may be pivotably arranged to the assembly base, for example via a pivoting connection, such as a hinge. The locking element is configured to lock the ear cup arm in a first position relative to the assembly base. The spring assembly is configured to move the ear cup arm to a second position relative to the assembly base upon release of the locking element. In one or more example joint assemblies, the spring assembly comprises a first spring configured to move the ear cup arm to a second position relative to the assembly base upon release of the locking element. The first position of the ear cup arm can herein be seen as a closed position in which an ear cup arranged on a distal end of the ear cup arm is arranged to cover an ear of a user of the joint assembly, when the joint assembly is mounted to a head piece assembly, such as a helmet, and the head piece assembly is worn by the user. The second position of the ear cup arm can herein be seen as an open position in which the ear cup arranged on the distal end of the ear cup arm is arranged at a distance from an ear of the user of the joint assembly, such that the ear cup does not cover the ear of the user, when the joint assembly is mounted to a head piece assembly, such as a helmet, and the head piece assembly is worn by the user.

In one or more example joint assemblies, the locking element comprises a first locking surface configured to lock the ear cup arm in the first position relative to the assembly base. In one or more example joint assemblies, the locking element comprises a second locking surface. The second locking surface may be offset from the first locking surface. The second locking surface may be configured to lock the ear cup arm in a third position relative to the assembly base. The third position may be an intermediate position between the first position and the second position. The third position may be a position in which the distance between two ear cups of respective joint assemblies arranged on opposite sides of a head piece assembly are arranged at a distance from each other which is larger than a distance between the two ear cups when the ear cup arms are respectively arrange in the first position. In other words. the locking element may comprise a plurality of locking surfaces for locking the ear cup arm multiple engagement positions. The first position and the third position may both be closed positions in which the ear cup covers an ear of the user, but may be adapted for different head shapes, so that the intermediate position creates a wider distance between two ear cups arranged on respective joint assemblies mounted to the head piece assembly than the first position.

In one or more example joint assemblies, the locking element is movably arranged in relation to the ear cup arm between a locking position and a release position.

In one or more example joint assemblies, the spring assembly is configured to move, such as displace, the locking element into the locking position. In other words, the spring assembly may be configured to exert a force on the locking element, which force displaces the locking element into the locking position.

In one or more example joint assemblies, the spring assembly comprises a first spring element configured to move, such as displace, the ear cup arm to the second position. In one or more example joint assemblies, the spring assembly comprises a second spring element configured to move, such as displace, the locking element into the locking position. The spring elements, such as the first spring element and the second spring element, may be one or more of a coil spring, a torsion spring, a wave spring, a spiral spring, and a helical compression spring. Depending on their mounting position, the spring elements may either exert a pulling force or a pushing force onto the ear cup arm or the locking element, respectively. To release the locking element, such as to bring the locking element into the released position, the user of the joint assembly may slide the locking element in an opposite direction to the direction of the spring force acting on the locking element, until the locking surface of the locking element disengages from the locking surface of the assembly base and/or the ear cup arm and allows the ear cup arm to pivot around the pivot point.

In one or more example joint assemblies, the locking element is slidably arranged on the ear cup arm. The locking element may be slidably arranged, such as along an axis parallel to the ear cup arm, between a locking position and a release position.

In one or more example joint assemblies, the first locking surface is arranged at a first distance from the ear cup arm in a direction perpendicular to the ear cup arm and is configured to engage the assembly base.

In one or more example joint assemblies, the second locking surface is arranged at a second distance from the ear cup arm in a direction perpendicular to the ear cup arm and is configured to engage the assembly base.

In one or more example joint assemblies, the locking element is pivotably arranged to the assembly base and configured to engage the ear cup arm in the first position of the ear cup arm.

In one or more example joint assemblies, the first locking surface is arranged at a first distance from the base assembly in a direction perpendicular to the base assembly and is configured to engage the ear cup arm.

In one or more example joint assemblies, the second locking surface is arranged at a second distance from the ear cup arm in a direction perpendicular to the ear cup arm and is configured to engage the ear cup arm. The joint assembly may thus provide multiple engagement positions for the ear cup arm, thereby enabling two ear cups arranged to a head piece assembly to be secured at different distances from each other. This allows the joint assembly to be used by a plurality of user having different head sizes.

In one or more example joint assemblies, a proximal end of the ear cup arm is pivotably arranged to the assembly base. The proximal end of the ear cup arm being pivotably arranged to the assembly base can herein be seen as the pivot point of the ear cup arm to the assembly base being arranged closer to the proximal end of the ear cup arm than to the distal end of the ear cup arm.

In one or more example joint assemblies, the ear cup arm comprises an ear cup arranged at a distal end of the ear cup arm. The distal end of the ear cup arm can herein be seen as the end of the ear cup arm furthest away from the assembly base 2.

In one or more example joint assemblies, the assembly base comprises a mounting element for mounting the joint assembly to a head piece assembly, such as a helmet. The head piece assembly may comprise a corresponding receiver for releasably receiving the mounting element of the joint assembly. In one or more examples, the mounting element of the joint assembly and the receiver of the head piece assembly may be configured, such as formed, to create a dove tail joint for securing the joint assembly to the head piece assembly.

The figures are schematic and simplified for clarity, and they merely show details which aid understanding the disclosure, while other details have been left out. Throughout, the same reference numerals are used for identical or corresponding parts.

Figure 1B:
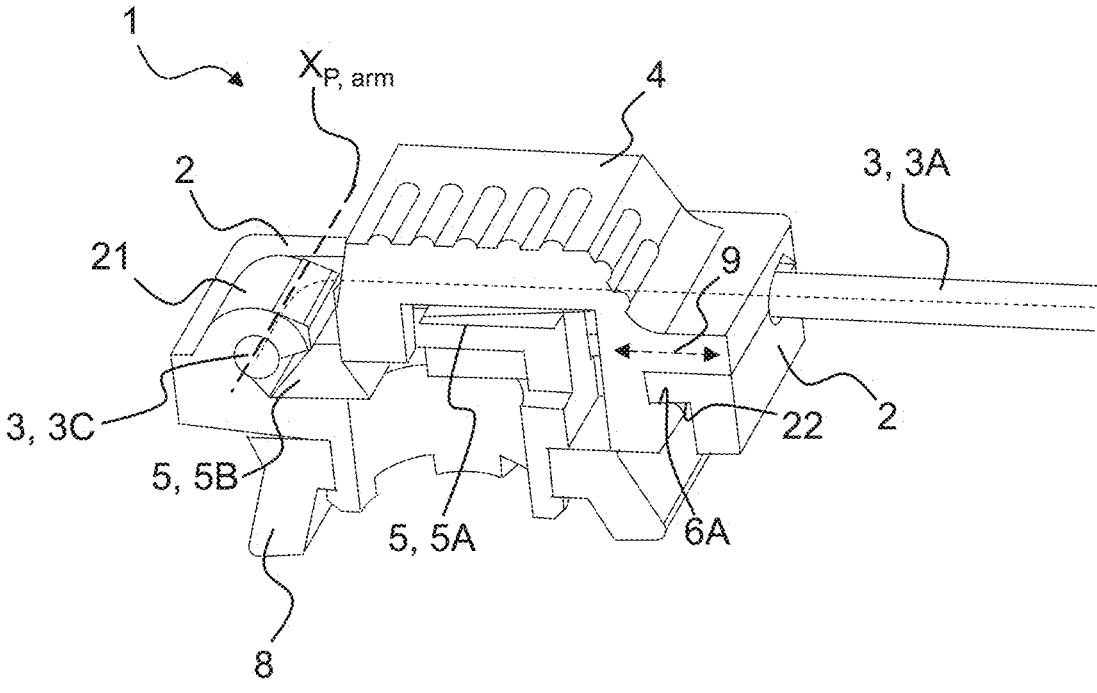
FIG. 1B illustrates a cross section view along a longitudinal centreline of the first example joint assembly according to this disclosure.

FIGS. 1A to 1B illustrate a first example joint assembly 1 for a helmet system according to the current disclosure. The joint assembly comprises an assembly base 2, an ear cup arm 3, a locking element 4, and a spring assembly 5. The ear cup arm 3 is pivotably arranged to the assembly base 2 around a pivot axis $X_{P, arm}$, for example via a hinge. In the example joint assembly shown in FIGS. 1A-1B, the ear cup arm 3 may comprise a rod, such as a U-shaped rod, comprising a first leg 3A and a second leg 3B connected by a connecting portion 3C. The first leg 3A and the second leg 3B may extend in parallel to each other. The first leg 3A, the second leg 3B, and the connecting portion 3C of the ear cup arm 3 may be an integral piece, such as made from a single rod bent into shape to form the first leg 3A, the second leg 3B, and the connecting portion 3C. FIG. 1B shows a cross section view along a longitudinal centreline of the joint assembly 1, such as a centreline extending in parallel to the first leg part 3A and/or the second leg part 3B (not shown in FIG. 1A). As can be seen in FIG. 1B, a cross section of the first leg 3A, the second leg 3B, and the connecting portion 3C of the ear cup arm 3 may be circular. In the example joint assembly 1 of FIGS. 1A-1B, the base part 2 comprise a receiver 21 for receiving the connecting portion 3C of the ear cup arm 3. The receiver 21 may have a semi-circular cross section, such as a circular cross-section having a cut out for allowing an insertion of connecting portion 3C into the receiver. Due to the circular cross section of the ear cup arm, such as of the connecting portion 3C, the connecting portion 3C can rotate within the receiver 21. The pivot axis $X_{P, arm}$ may thus correspond with a centreline of the connecting portion 3C. In other words, the receiver 21 and the connecting portion 3C may act as the hinge for pivotably arranging the ear cup arm 3 to the assembly base 2.

In the examples shown in FIGS. 1A-1B, the ear cup arm 3 is in a first position relative to the assembly base 2. The locking element 4 is configured to lock the ear cup arm 3 in the first position relative to the assembly base 2. The locking element 4 is movably arranged in relation to the ear cup arm 3 between a locking position and a release position. In the example joint assembly of FIGS. 1A-1B, the locking element 4 is slidably arranged on the ear cup arm 3 along an axis 9 parallel to the ear cup arm 3, such as along the first leg 3A and/or the second leg 3B, between the locking position and the release position. The locking element 4 is slidably arranged in relation to the assembly base 2.

The locking element 4 comprises a first locking surface 6A configured to lock the ear cup arm 3 in the first position relative to the assembly base 2. The assembly base 2 may comprise a base locking surface 22. The base locking surface 22 is configured to engage with the first locking surface 6A of the locking element 4 to prevent a pivoting motion of the ear cup arm 3 and the locking element 4 around the pivot axis $X_{P, arm}$. The base locking surface 22 may be arranged in a plane parallel to the ear cup arm 3, such as the first leg 3A and/or the second leg 3B of the ear cup arm 3.

In one or more example joint assemblies 1, the locking element 4 may comprise a second locking surface (not shown in FIGS. 1A-1B). The second locking surface may be arranged at a second distance from the ear cup arm 3 in a direction perpendicular to the ear cup arm 3 and is configured to engage the assembly base 2, such as the base locking surface 22 when the ear cup arm 3 is in a different angular position around the pivot axis $X_{P, arm}$ than in the first position.

The spring assembly 5, such as the first spring element 5A of the spring assembly 5, is configured to move the ear cup arm 3 to a second position relative to the assembly base 2 upon release of the locking element 4. The first spring element 5A may be arranged between the assembly base 2 and the ear cup arm 3 or the locking element 4. In other words, a first end of the first spring element may abut the ear cup arm 3 and/or the locking element 4. A second end of the first spring element 5A may abut the assembly base 2. The first spring element 5A may exert a first force on the ear cup arm 3 and/or the locking element, which first force pushes the ear cup arm 3 into the second position relative to the assembly base 2 upon release of the locking element 4. The force exerted by the first spring element 5A on the ear cup arm 3 may be counteracted by moving the locking element 4 into the locked position in which the first locking surface 6A is brought into engagement with the base locking surface 22. The spring assembly 5, such as the second spring element 5B, is configured to move the locking element 4 into the locking position. The second spring element 5B may be configured to exert a second force on the locking element 4, the second force causing the locking element 4 to perform a translational movement along the ear cup arm 3. Upon the ear cup arm 3 being brought into the first position relative to the assembly base 2, the second force exerted by the second spring element 2 forces the locking element 4 to perform the translational movement along the ear cup arm 3 which causes the first locking surface 6A to engage with the base locking surface 22. To release the locking element 4 and move the ear cup arm 3 into the second position, such as the released position, the user may slide the locking element 4 against the spring force of the second spring element 5B, until the first locking surface disengages from the base locking surface 22. When the first locking surface 6A disengages from the base locking surface, the spring force from the first spring element 5A will push the ear cup arm into the second position, such as the released position, of the ear cup arm 3. In the example joint assembly 1 of FIGS. 1A-1B, the first spring element 5A and/or the second spring element 5B are sheet metal springs, such as springs formed from a bent sheet of metal.

The assembly base 2 may comprise a mounting element 8 for mounting, such as releasably mounting, the joint assembly 1 to a head piece assembly, such as a helmet. The mounting element 8 may be a quick release mounting element configured to be attached to a corresponding mounting element on the head piece assembly, such as the helmet. In one or more example joint assemblies, the mounting element has a trapezoidal shape with a wider base towards a head piece assembly facing side 8B of the mounting element. In other words, the mounting element 8 may comprise a tapered mounting surface 8A tapered outwards toward the head piece assembly facing side 8B of the mounting element 8. In one or more example joint assembles, the mounting element 8 may thus be a dovetail joint. The mounting element 8 may be configured to be received in a receiver, such as to a correspondingly tapered receiver, arranged on the head piece assembly.

Figure 2A:
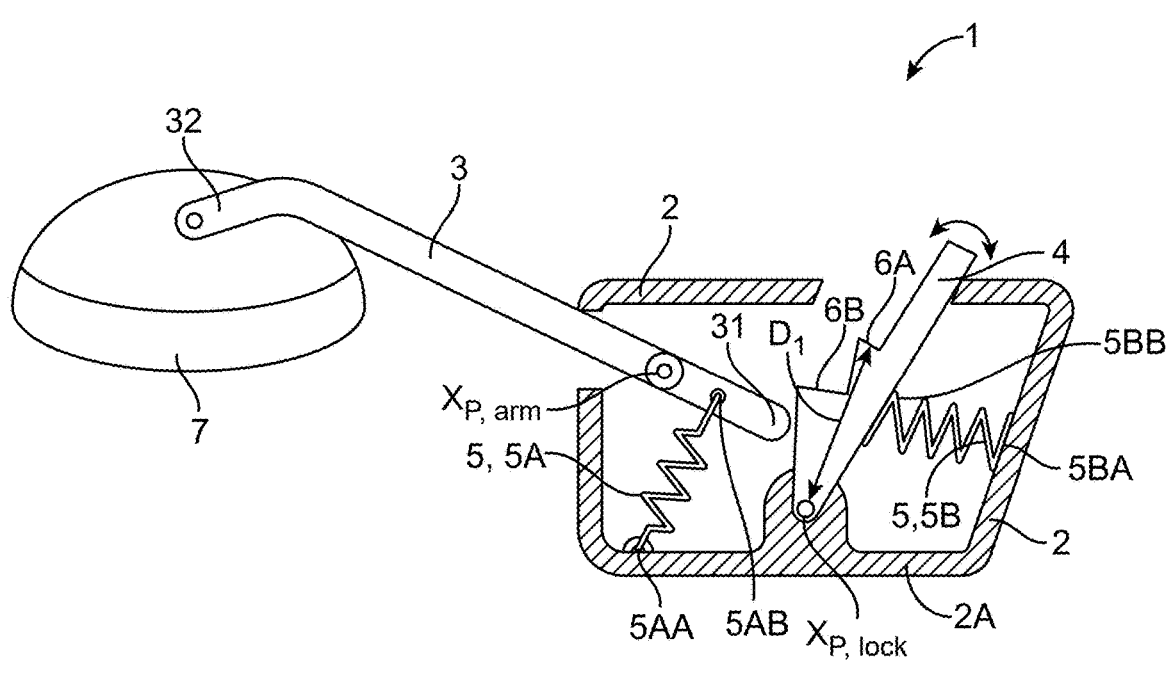
FIG. 2A illustrates a cross section view of a second example joint assembly in an open position according to this disclosure.
Figure 2B:
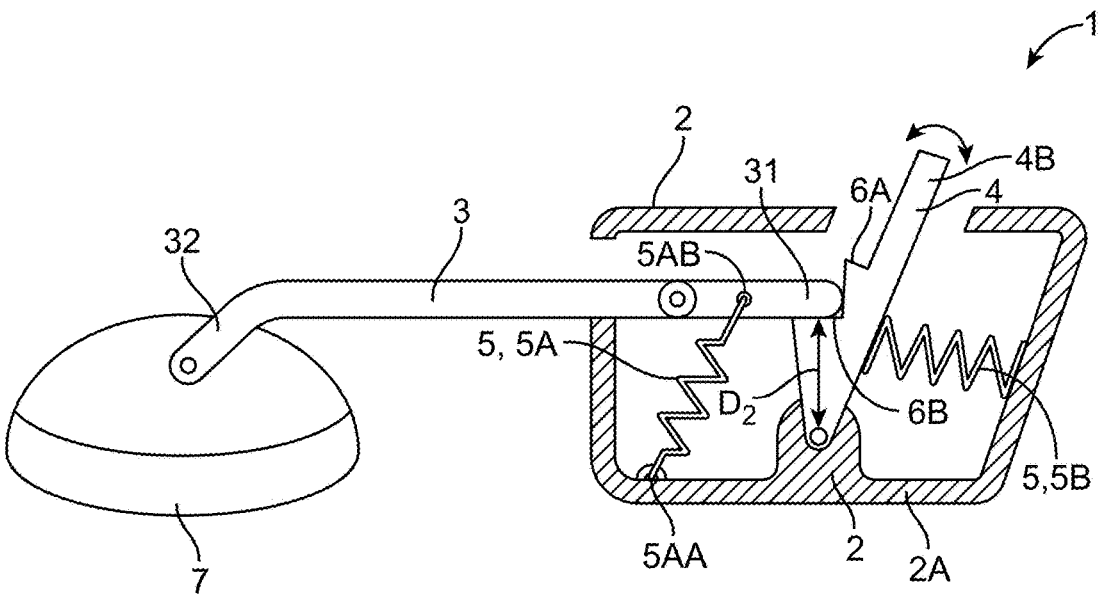
FIG. 2B illustrates a cross section view of the second example joint assembly in a closed position according to this disclosure.

FIGS. 2A-2B illustrate a cross section view along a longitudinal centreline of a second example joint assembly 1 for the helmet system according to the current disclosure. The joint assembly 1, such as the ear cup arm 3, comprises an ear cup 7 arranged at a distal end 3B of the ear cup arm 3. In the second example joint assembly 1, the ear cup arm 3 is pivotably arranged to the assembly base 2, such as via a pivot point $X_{P,arm}$. The pivot point $X_{P,arm}$ may be a pivot axis, such as an axle extending from a first side of the assembly base 2 to a second side of the assembly base 2 in a direction perpendicular to a longitudinal direction of the ear cup arm 3. The ear cup arm 3 may be configured to pivot between a first position, as shown in FIG. 2B, to a second position, as shown in FIG. 2A. The first position shown in FIG. 2B is a closed position of the ear cup arm 3. The second position shown in FIG. 2B is an open position of the ear cup arm 3. The ear cup arm 3 may be pivotably arranged to the assembly base 2 at a proximal end 31 of the ear cup arm 3. The ear cup arm 3 being pivotably arranged at the proximal end 31 can herein be seen as the pivot point being arranged closer to the proximal end 31 than to the distal end 32.

The first position of the ear cup arm 3 can herein be seen as a closed position in which the ear cup 7 arranged on the distal end 32 of the ear cup arm 3 is arranged to cover an ear of a user of the joint assembly 1, when the joint assembly 1 is mounted to a head piece assembly, such as a helmet, and the head piece assembly is worn by the user. The second position of the ear cup arm 3 can herein be seen as an open position in which the ear cup 7 arranged on the distal end 32 of the ear cup arm 3 is arranged at a distance from an ear of the user of the joint assembly, such that the ear cup 7 does not cover the ear of the user, when the joint assembly 1 is mounted to a head piece assembly, such as a helmet, and the head piece assembly is worn by the user.

The assembly base 2 may be shaped as a housing having an opening for allowing the ear cup arm 3 to protrude from the inside of the housing to the outside of the housing. The size of the opening may be selected such that it allows a pivoting of the ear cup arm 3 between the first position and the second position of the ear cup arm 3.

In the second example joint assembly 1 of FIGS. 2A-B, the locking element 4 is pivotably arranged to the assembly base 2, such as via a pivot point $X_{P, lock}$.

The locking element 4 is further configured to engage the ear cup arm 3 in the first position of the ear cup arm 3, so that the ear cup arm 3 is secured from leaving the first position without the user performing a dedicated procedure to release the locking element 4.

The locking element 4 of the example joint assembly 1 of FIGS. 2A-B, may comprise a plurality of locking surfaces, such as a first locking surface 6A and a second locking surface 6B. The first locking surface 6A may be arranged at a first distance $D_1$ from the base assembly 2 in a direction perpendicular to the base assembly 2, such as to a bottom surface 2A of the base assembly 2. The first locking surface 6A may be configured to engage the ear cup arm 3, such as the proximal end 31 of the ear cup arm 3, when the ear cup arm 3 is in the first position.

The second locking surface 6B may be arranged at a second distance $D_2$ from the base assembly 2 in a direction perpendicular to the base assembly 2, such as to the bottom surface 2A of the base assembly 2. The second locking surface 6B is configured to engage the ear cup arm 3, such as the proximal end 31 of the ear cup arm 3, when the ear cup arm is in a third position, such as an intermediate position between the first position and the second position of the ear cup arm 3.

The second locking surface 6B, may be offset from the first locking surface 6A, such as by a distance $D_1$-$D_2$. The second locking surface 6B may be configured to engage the ear cup arm 3, such as the proximal end 31 of the ear cup arm, and lock the ear cup arm 3 in a third position relative to the assembly base 2. The second locking surface 6B may be arranged at a second distance from the ear cup arm 3 in a direction perpendicular to the ear cup arm 3 and is configured to engage the ear cup arm 3.

The spring assembly 5 of the second example joint assembly 1 comprises the first spring element 5A configured to displace the ear cup arm 3 to, such as towards, the second position and the second spring element 5B configured to displace the locking element into one or more locking position. A first locking position of the one or more locking positions may be a position where the first locking surface 6A engages the ear cup arm 3 and locks the ear cup arm 3 in a first position relative to the assembly base 2. A second locking position of the one or more locking positions may be a position where the second locking surface 6B engages the ear cup arm 3 and locks the ear cup arm 3 in the third position, such as the intermediate position, relative to the assembly base 2.

In the second example joint assembly 1 of FIGS. 2A-2B, a first end 5AA of the first spring element 5A may be connected to the assembly base 2, such as to an inner surface of the assembly base 2 on a side wall 2A of the assembly base being configured to face the head piece assembly when the joint assembly 1 is mounted to the head piece assembly. In the example joint assembly 1 of FIGS. 2A-2B, the inner surface is an inner surface of a wall of the base assembly 2 facing a head piece assembly, such as a helmet, when the joint assembly is mounted to the head piece assembly. A second end 5AB of the first spring element 5A may be connected to the proximal end 31 of the ear cup arm 3. The first spring element 5A may be a tension spring, such as a spring exerting a pulling force on the proximal end 31 of the ear cup arm 3 towards the inner surface of the assembly base 2. In one or more example joint assemblies, the tension spring is a helical coil spring. By exerting a pulling force on the proximal end 31 of the ear cup arm 3, the ear cup arm 3 pivots around the pivot point $X_{P, arm}$ so that the distal end 32 of the ear cup arm 3, to which the ear cup 7 is attached, moves away from a user of the joint assembly when the joint assembly is attached to a head piece assembly worn by the user. However, in case the first end 5AA of the first spring element 5A is mounted to a surface of the assembly base being arranged on the opposite side of the proximal end 31 of the ear cup arm 3, the first spring element 5A may be a compression spring exerting a pushing force on the proximal end 31 of the ear cup arm 3, forcing the proximal end 31 of the ear cup arm 3 towards the side wall 2A of the assembly base 2 being configured to face the head piece assembly when the joint assembly 1 is mounted to the head piece assembly.

A first end 5BA of the second spring element may be arranged on the base assembly and a second end 5BB of the second spring element 5B may be arranged on the locking element 5, so that the second spring exerts a force on the locking element pushing the locking element 4, such as the first locking surface 6A and/or the second locking surface 6B into engagement with the ear cup arm 3, such as the proximal end 31 of the ear cup arm 3. The second spring element 5B may be a compression spring, such as a helical coil spring opposing compression along an axis of wind of the coil spring.

The locking element 4 may comprise a proximal end 4A pivotable arranged to the assembly base 2 and a distal end 4B. In the second example joint assemble 1 of FIGS. 2A-2B, the locking element 4, such as the distal end 4B of the locking element 4, protrudes from the assembly base 2, such as through a side wall of the assembly base 2. To release the locking element 4 and allow the ear cup arm 3 to move to the second position, such as the open position, of the ear cup arm 3, the user may manually displace the locking element 4 into the release position by moving the distal end 4B of the locking element against the force exerted by the second spring element 5B.

Figure 3:
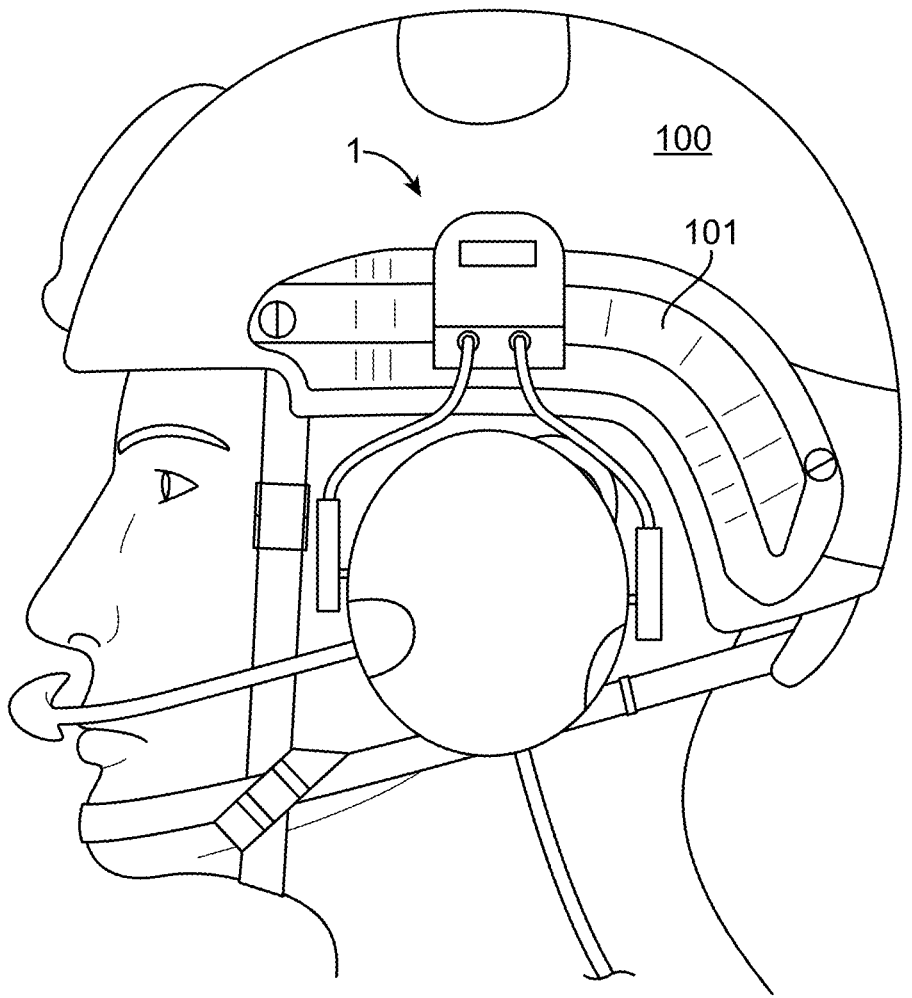
FIG. 3 illustrates a head piece assembly comprising the joint assembly according to this disclosure.

FIG. 3 illustrates the joint assembly 1 mounted on a head piece assembly 100, such as a helmet. The head piece assembly 100 may comprise a receiver 101 for releasably receiving the joint assembly 1, such as the mounting element 8 of the joint assembly 1. In one or more example head piece assemblies, the receiver is configured to receive a dove tail joint. The head piece assembly 100 comprises two joint assemblies 1 arranged on opposite sides of the head piece assembly 100.

It shall be noted that the features mentioned in the embodiments described in FIGS. 1-3 are not restricted to these specific embodiments. Any features relating to the ear cup arm, the ear cup, and or the assembly base and the components comprised therein and mentioned in relation to the first example joint assembly of FIGS. 1A-B, such as spring types, surfaces and walls of the assembly base, and/or mounting elements of the joint assembly, are thus also applicable to the second example joint assembly described in relation to FIGS. 2A-B, and vice versa.

Embodiments of products (joint assembly) according to the disclosure are set out in the following items:

Item 1. A joint assembly (1) for a helmet system, the joint assembly (1) comprising:
an assembly base (2),
an ear cup arm (3),
a locking element (4), and
a spring assembly (5),
wherein the ear cup arm (3) is pivotably arranged to the assembly base (2), the locking element (4) is configured to lock the ear cup arm (3) in a first position relative to the assembly base (2), and the spring assembly (5) is configured to move the ear cup arm (3) to a second position relative to the assembly base (2) upon release of the locking element (4).

Item 2. The joint assembly (1) according to Item 1, wherein the locking element (4) comprises a first locking surface (6A) configured to lock the ear cup arm (3) in the first position relative to the assembly base (2).

Item 3. The joint assembly (1) according to any one of the Items 1 to 2, wherein the locking element (4) comprises a second locking surface, offset from the first locking surface (6A), configured to lock the ear cup arm (3) in a third position relative to the assembly base (2).

Item 4. The joint assembly (1) according to any one of previous Items, wherein the locking element (4) is movably arranged in relation to the ear cup arm (3) between a locking position (7) and a release position.

Item 5. The joint assembly (1) according to Item 4, wherein the spring assembly (5) is configured to move the locking element (4) into the locking position.

Item 6. The joint assembly (1) according to Item 5, wherein the spring assembly (5) comprises a first spring element (5A) configured to move the ear cup arm (3) to the second position and a second spring element (5B) configured to move the locking element (4) into the locking position.

Item 7. The joint assembly (1) according to any one of the Items 1 to 6, wherein the locking element (4) is slidably arranged on the ear cup arm (3) along an axis parallel to the ear cup arm (3) between a locking position and a release position.

Item 8. The joint assembly (1) according to Item 7 and Item 2, wherein the first locking surface (6A) is arranged at a first distance from the ear cup arm (3) in a direction perpendicular to the ear cup arm (3) and is configured to engage the assembly base (2).

Item 9. The joint assembly (1) according to Item 7 or 8 and Item 3, wherein the second locking surface (6A) is arranged at a second distance from the ear cup arm (3) in a direction perpendicular to the ear cup arm (3) and is configured to engage the assembly base (2).

Item 10. The joint assembly (1) according to any one of the Items 1 to 6, wherein the locking element (4) is pivotably arranged to the assembly base (2) and configured to engage the ear cup arm (3) in the first position of the ear cup arm (3).

Item 11. The joint assembly (1) according to Item 10 and Item 2, wherein the first locking surface (6A) is arranged at a first distance from the base assembly (2) in a direction perpendicular to the base assembly (2) and is configured to engage the ear cup arm (3).

Item 12. The joint assembly (1) according to Item 10 or 11 and Item 3, wherein the second locking surface (6B) is arranged at a second distance from the ear cup arm (3) in a direction perpendicular to the ear cup arm (3) and is configured to engage the ear cup arm (3).

Item 13. The joint assembly (1) according to any one of the previous Items, wherein a proximal end (31) of the ear cup arm (3) is pivotably arranged to the assembly base (2).

Item 14. The joint assembly (1) according to any one of the previous Items, wherein the ear cup arm (3) comprises an ear cup (7) arranged at a distal end (3B) of the ear cup arm (3).

Item 15. The joint assembly (1) according to any one of the previous Items, wherein the assembly base (2) comprises a mounting element (8) for mounting the joint assembly (1) to a helmet.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A joint assembly for a helmet system, the joint assembly comprising:

a base assembly;

an ear cup arm;

a locking element; and a spring assembly;

wherein the ear cup arm is pivotable with respect to the base assembly, the locking element is configured to lock the ear cup arm in a first position relative to the base assembly, wherein the spring assembly is configured to bias the ear cup arm away from a user of the helmet system, and to move the ear cup arm to a second position relative to the base assembly upon release of the locking element; and wherein the spring assembly comprises a first spring element configured to move the ear cup arm to the second position, and a second spring element configured to move the locking element to a locking position.

2. The joint assembly according to claim 1, wherein the locking element comprises a first locking surface configured to lock the ear cup arm in the first position relative to the base assembly.

3. The joint assembly according to claim 2, wherein the locking element comprises a second locking surface offset from the first locking surface, and wherein the second locking surface is configured to lock the ear cup arm in a third position relative to the base assembly.

4. The joint assembly according to claim 1, wherein the locking element is movably arranged in relation to the ear cup arm between the locking position and a release position.

5. The joint assembly according to claim 1, wherein the locking element is slidably arranged on the ear cup arm along an axis parallel to the ear cup arm between the locking position and a release position.

6. The joint assembly according to claim 5, wherein the locking element comprises a first locking surface at a first distance from the ear cup arm in a direction perpendicular to the ear cup arm, and is configured to engage the base assembly.

7. The joint assembly according to claim 6, wherein the locking element comprises a second locking surface at a second distance from the ear cup arm in the direction perpendicular to the ear cup arm, and is configured to engage the base assembly.

8. The joint assembly according to claim 1, wherein the locking element is pivotably arranged with respect to the base assembly, and is configured to engage the ear cup arm when the ear cup arm is in the first position.

9. The joint assembly according to claim 8, wherein the locking element comprises a first locking surface at a first distance from the base assembly in a direction perpendicular to the base assembly and is configured to engage the ear cup arm.

10. The joint assembly according to claim 9, wherein the locking element comprises a second locking surface at a second distance from the base assembly in a direction perpendicular to the ear cup arm, and is configured to engage the ear cup arm.

11. The joint assembly according to claim 1, wherein a proximal end of the ear cup arm is pivotably arranged with respect to the base assembly.

12. The joint assembly according to claim 1, further comprising an ear cup at a distal end of the ear cup arm.

13. The joint assembly according to claim 1, wherein the base assembly comprises a mounting element configured to mount the joint assembly to a helmet.

* * * * *